United States Patent [19]

Singer

[11] Patent Number: 4,802,634
[45] Date of Patent: Feb. 7, 1989

[54] BELT REEL-IN MECHANISM

[75] Inventor: Kalus P. Singer, Hamburg, Fed. Rep. of Germany

[73] Assignee: Autoflug GmbH & Co. Fahrzeugtechnik, Rellingen, Fed. Rep. of Germany

[21] Appl. No.: 42,414

[22] Filed: Apr. 24, 1987

[30] Foreign Application Priority Data

Apr. 26, 1986 [DE] Fed. Rep. of Germany ....... 3614283

[51] Int. Cl.⁴ ...................... B60R 22/38; B60R 22/40
[52] U.S. Cl. ...................... 242/107.4 A; 242/107.4 B
[58] Field of Search ................ 242/107.4 R, 107.4 A, 242/107.4 B, 107.4 C, 107.4 D, 107.4 E; 280/806; 297/478, 480

[56] References Cited

U.S. PATENT DOCUMENTS 4,277,036  7/1981  Seifert et al. ............... 242/107.4 A

FOREIGN PATENT DOCUMENTS 2817214  10/1979  Fed. Rep. of Germany ... 242/107.4 A
2151458   7/1985  United Kingdom ......... 242/107.4 B Primary Examiner—John M. Jillions
Attorney, Agent, or Firm—Becker & Becker, Inc.

[57] ABSTRACT

A self-locking belt reel-in mechanism, especially for the safety belts of motor vehicles. The mechanism includes a belt-winding spindle that is mounted in a housing and is loaded by a rewinding spring. The spindle includes a spindle core and a spindle body, at each end of which are disposed two locking members that operate radially between an inner position and an outer position, are adapted to be surrounded by stops on the housing, and bring about a symmetrical quadruple locking. The locking members are coupled by connecting rods that are parallel to the central axis of the spindle, are disposed within the cross-sectional area of the spindle, and rotate with the latter. When self-locking is initiated via a system that is sensitive to movement of the belt and/or vehicle, the locking members mesh with the housing stops. The connecting rods have ends on which are integrally connected the locking members, which enclose the spindle core symmetrically relative to the respective connecting rod. The locking members are pivotable about the longitudinal axis of their connecting rod in a radially outward direction until they mesh in the housing stops, which are in the form of toothings.

14 Claims, 7 Drawing Sheets

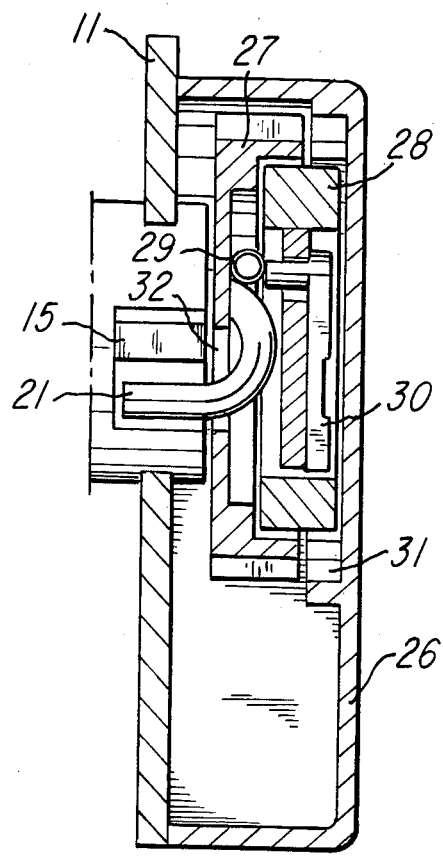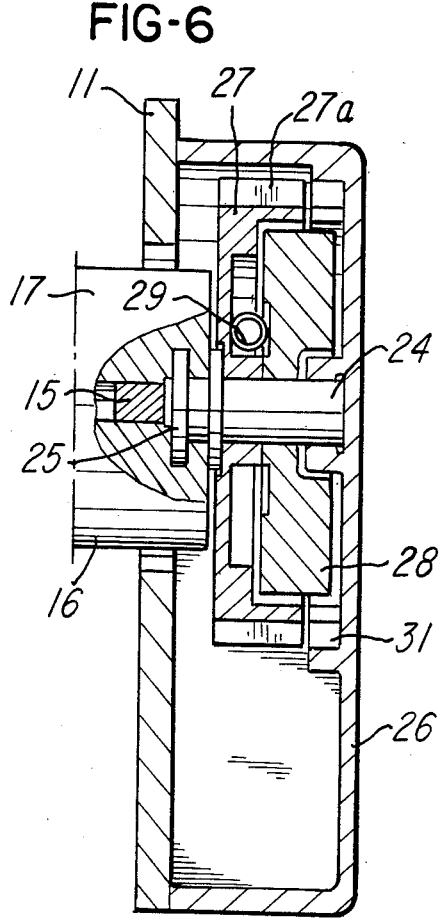

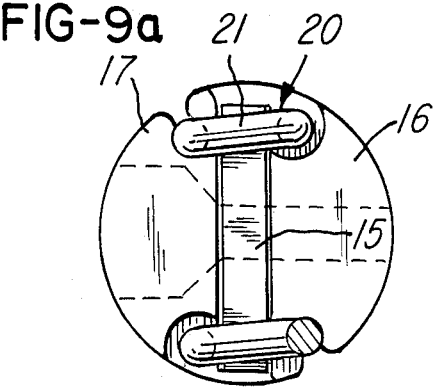
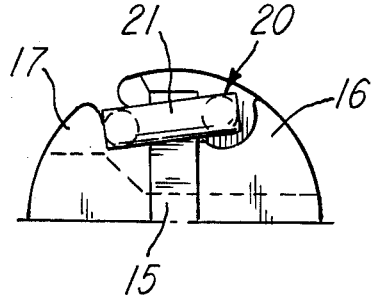
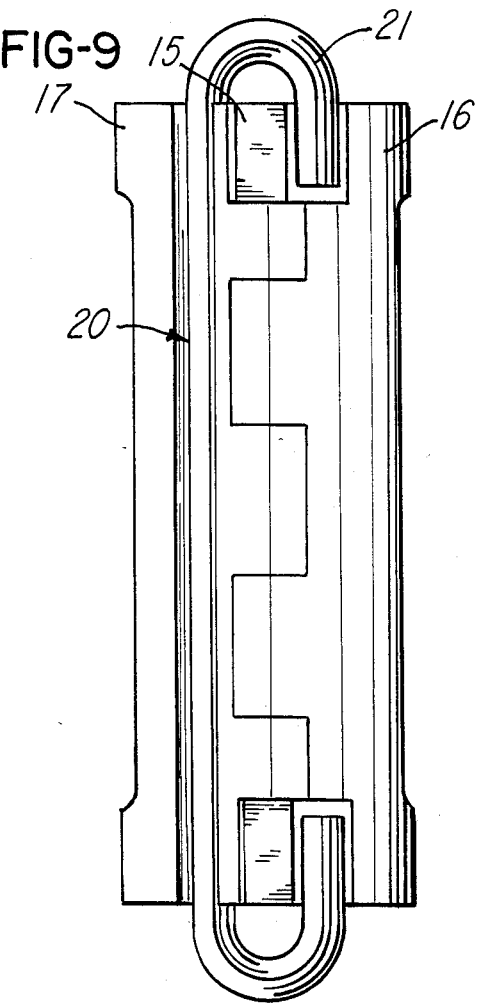
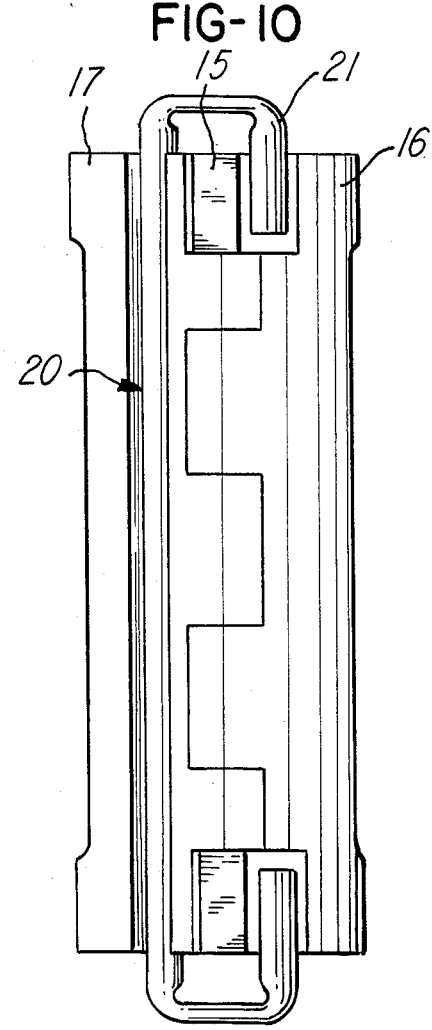

BELT REEL-IN MECHANISM

BACKGROUND OF THE INVENTION

The present invention relates to a self-looking belt reel-in mechanism, especially for the safety belts of motor vehicles. The mechanism includes a belt-winding spindle that is mounted in a housing and is loaded by a rewinding spring. The belt-winding spindle oomprises a spindle core and a plastic spindle body, at each end of which are disposed two looking members that operate radially between an inner position and an outer position, are adapted to be surrounded by stops on the housing, and bring about a symmetrical quadruple looking. The locking members are coupled by connecting rods that are parallel to the central axis of the belt-winding spindle, are disposed within the cross-sectional area of this spindle, and rotate with the latter. When self-locking is initiated via a system that is sensitive to the movement of the belt and/or of the vehicle, the locking members mesh with the stops on the housing.

A belt reel-in mechanism of this general type is disclosed in German Offenlegungsschrift No. 28 26 286 Seifert et al filed June 15, 1978 and corresponding to U.S. Pat. No. 4,277,036- Seifert et al dated July 7, 1981. In this known mechanism, two separate locking members are disposed on each side of the mechanism. By rotating the pertaining connecting rod, the spring-loaded locking members are moved radially outwardly until they mesh with the toothing of the housing. The force for returning the locking members from the locking position is applied by a spring that directly couples the two locking members.

The drawback of this known belt reel-in mechanism is that a respective locking member must be secured to each end of both of the connecting rods. In addition to requiring a relatively large expenditure for material, this known mechanism also sets high requirements on the precision in determining the position of the locking members relative to the pertaining connecting rods, since a satisfactory operation of the locking members can be assured only if the construction is exactly symmetrical. In addition, the control element, in the form of a control disk, must be disposed next to the locking members, thus requiring an appropriate width for the belt reel-in mechanism. It should also be noted that the return of the locking members via only the springs that connect these members does not assure a synchronous progression of the unlocking, which can adversely affect the functional reliability of the belt reel-in mechanism.

It is therefore an object of the present invention to improve the belt reel-in mechanism of the aforementioned general type in such a way that while keeping the overall width small, the configuration of the locking members is simplified and in particular a synchronous performance during locking and unlocking is achieved.

BRIEF DESCRIPTION OF THE DRAWINGS

This object, and other objects and advantages of the present invention, will appear more clearly from the following specification in conjunction with the accompanying schematic drawings, in which:

FIG. 5 is a cross-sectional view through the operational end of the system;

FIG. 6 is a further cross-sectional view through the operational end of the mechanism;

FIG. 9 is a schematic plan view of the spindle profile and connecting rods;

FIG. 9a is a front view of the arrangement of FIG. 9;

FIG. 10 is a schematic plan view of another exemplary embodiment of the spindle profile and connecting rods; and FIG. 10a is a partial front view of the arrangement of FIG. 10.

SUMMARY OF THE INVENTION

Figure 1:
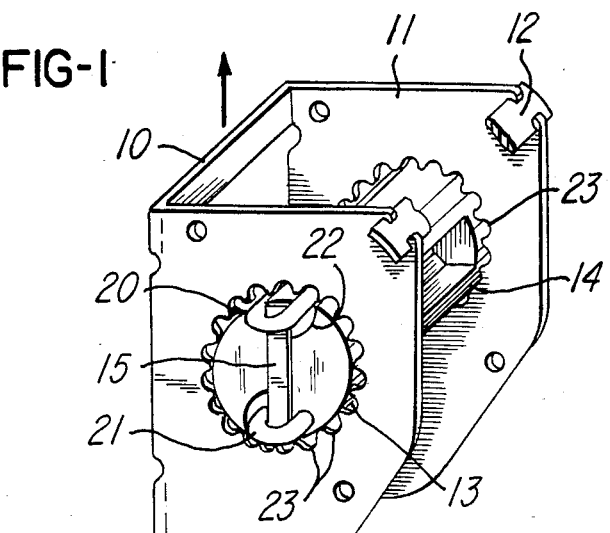
FIG. 1 is a diagrammatic view of one exemplary embodiment of the inventive self-locking belt reel-in mechanism.

The belt reel-in mechanism of the present invention is characterized primarily in that the connecting rods have ends on which are integrally connected the locking members, which enclose the spindle core symmetrically relative to the respective connecting rod, with the locking members being pivotable about the longitudinal axis of their connecting rod in a radially outward direction until they mesh in the housing stops, which are in the form of toothings.

The present invention first of all has the advantage that a particularly straightforward configuration of the locking members is provided sinoe now the connecting rods and those parts that operate as locking members are integrally constructed and as such are mounted in the plastic body of the spindle. This assures an absolute synchronism during locking of the belt reel-in mechanism since the locking member configurations always have the same geometrical relationship to the connecting rods. Supporting the locking members on the one hand on the toothing of the housing, and on the other hand on the spindle core that receives the force, assures that the mounting of the locking members, in the form of the connecting rods, during locking is advantageously not stressed by the torque that is to be transmitted from the spindle to the housing.

A further advantage of the inventive configuration of the locking members is that the connecting rods, and their bent portions that act as the locking members, can have a round cross-sectional shape that is easy to produce and easy to handle during assembly. Consequently, the toothing of the housing can be provided with half-round tooth sides, which requires less manufacturing effort.

Pursuant to a preferred embodiment of the present invention, the locking members, which are bent from the connecting rods in a U-shaped manner, extend twice through the control disk of the belt-sensitive or vehicle-sensitive sYstem; in other words, the locking members enclose the control disk, so that the latter is now drawn considerably closer to the locking members, thus reducing the overall width of the belt reel-in mechanism. In addition, on the pertaining side of the belt reel-in mechanism there results a correspondingly directed return of the locking members during unlocking.

It is also possible, pursuant to a further specific embodiment of the present invention, to dispose an additional resetting disk on that end of the belt reel-in mechanism remote from the control disk end. This resetting disk supports the desired return of the locking members, which is hence synchronous to the control disk end. Just like in the case of the control disk, the U-shaped locking members also extend twice through the resetting disk, so that the configuration at this end of the belt reel-in mechanism also contributes to a reduction of the overall width. The resetting disk is spring-loaded relative to the spindle body, so that when the spindle is relieved of the pull of the belt, the locking members are returned to the starting position via angled portions that are appropriately disposed in the openings of the resetting disk.

With regard to assembly of the inventive belt reel-in mechanism, it can also be expedient to construct the plastic spindle body, which is provided with recess portions for accommodating the connecting rods and their bent portions, in two parts. Furthermore, when the half shells of the spindle body are joined together about the flat rectangular steel core, it is expedient to insert the mountings for the spindle or the control elements.

Further specific features of the present invention will be described in detail subsequently.

DESCRIPTION OF PREFERRED EMBODIMENTS

Referring now to the drawings in detail, the inventive belt reel-in mechanism includes a C-shaped housing 10 that has two side plates 11 which are held at a predetermined distance from one another by a spacer bar 12 that is disposed at the open side of the housing. A belt-winding spindle 14 is rotatably mounted in openings 13 in the side plates 11. A belt, which is not shown, is wound onto the spindle 14. The belt-winding spindle 14 comprises a flat, rectangular steel plate 15 as a core, and two half shells 16, 17 of a plastic spindle body. One end of the spindle 14, which extends beyond one of the side plates 11, is coupled with a winding spring 18 (FIGS. 7 and 8) that is also secured to a plastic cover 19.

Figure 2:
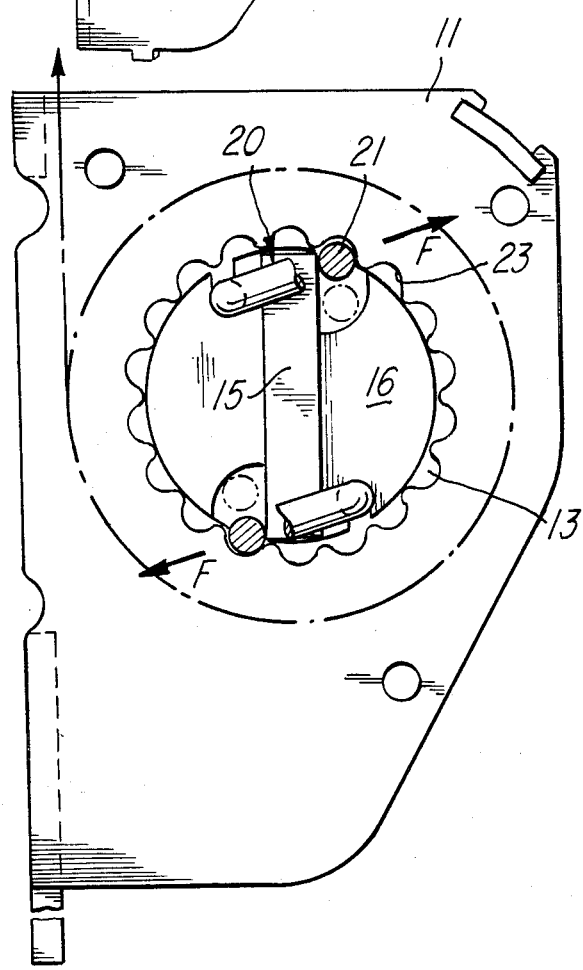
FIG. 2 is a schematic side view of such a belt reel-in mechanism.
Figure 3:
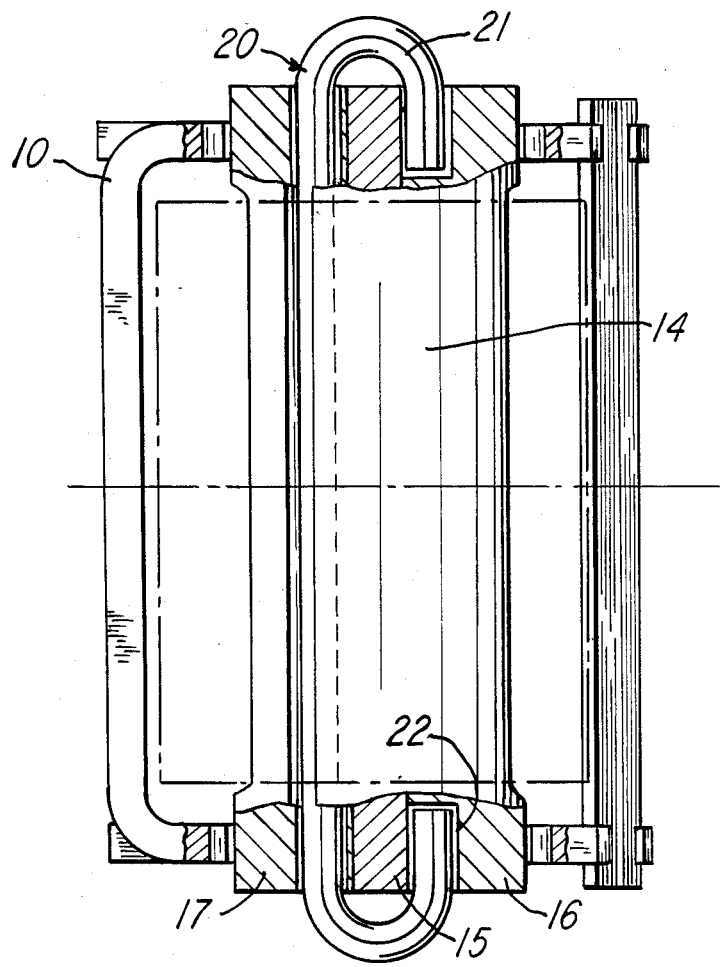
FIG. 3 is a partially sectioned plan view of the inventive mechanism.

A respective connecting rod 20 is disposed in the half shells 16, 17 at both ends of the steel core 15. The round portion of each connecting rod 20 that extends along the steel core 15 is rotatably clamped in the half shell in a positive manner. The two outer ends of each connecting rod 20 are bent over in a U-shaped manner, with the thus formed bent portions 21 extending symmetrically around the steel core 15. On that side opposite the pertaining connecting rod 20, a given bent portion 21 fits into an appropriately shaped recess 22 in the associated half shell 16 or 17. The extent of the bend in conformity to the planar distance between the connecting rod 20 and the bent portion 21, and the arrangement of the connecting rods 20 relative to the steel core 15 of the belt-winding spindle 14, are such that the bent portions 21 are rotatable radially outwardly beyond the contour of the steel core 15, in that in the state where the bent portions 21 are deflected into the locking position (FIG. 2), the spindle 14 serves as an abutment or support. Formed in the mounting openings 13 of the side plate 11 of the housing 10 are rsspective circumferential toothings 23 having tooth sides that are rounded in conformity to the round profile of the bent portions 21 which are adapted to engage the toothings 23.

Figure 4:
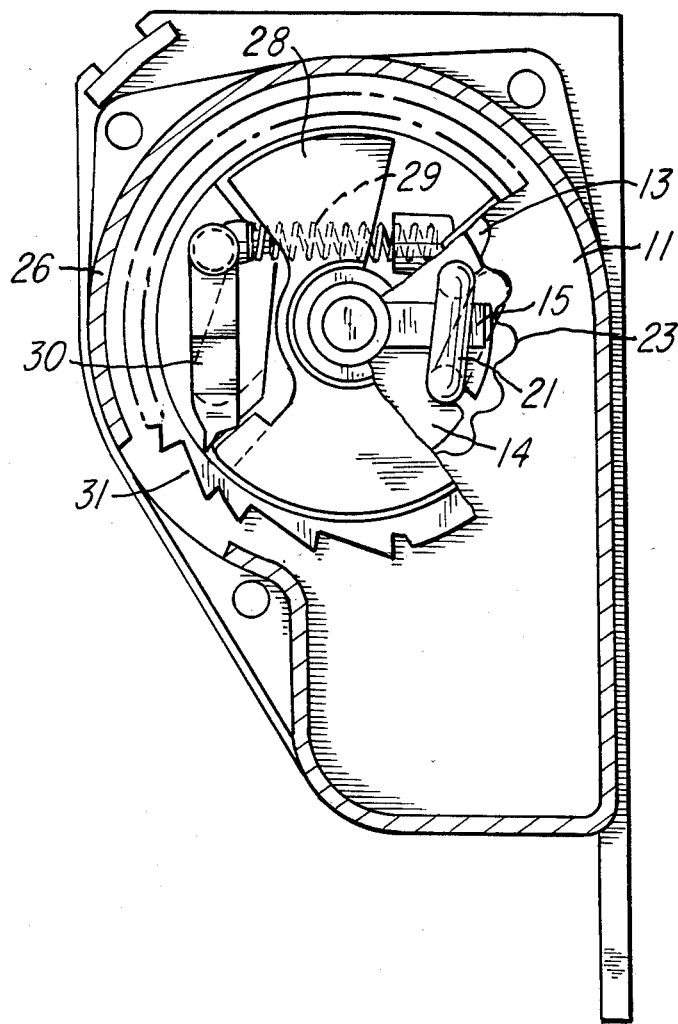
FIG. 4 is a partially sectioned side view of the operational end of the mechanism.

FIGS. 4-6 illustrate the so-called operational end of the belt reel-in mechanism, where there is provided the belt-sensitive or vehicle-sensitive control system for the deflection, into the locking position, of the bent portions 21 of the connecting rods 20, with these bent portions 21 acting as locking members. The construction and manner of operation of such systems are known, for example, from German Gebrauchsmuster No. 74 25 531 corresponding to Canadian Pat. No. 1,033,701-Pfabe dated Jun 27, 1981, belonging to the assignee of the present invention. The thing to note is that a tooth gap control mechanism is provided, the task and manner of operation of which is described in detail in, for example, German Offenlegungsschrift No. 28 17 214-Ernest dated Oct. 31, 1979 and belonging to the assignee of the present invention. Avoiding tooth upon tooth locking is of particular significance with regard to a synchronous locking of the belt reel-in mechanism at four locations.

As can be seen in particular from FIG. 6, the spindle 14 extends beyond the side plate 11 via a support pin or journal 24 that is fitted between the half shells 16, 17 of the spindle body via a flange 25; in the assembled state, the journal 24 is surrounded and held by these half shells 16, 17. Via the journal 24, the spindle 14 is mounted in a housing cover 26 that is secured to the side plate 11.

Mounted next to one another on the journal 24 are a control disk 27 and an inertial mass 28 that rotate with the spindle 14 and are loaded relative to one another via a spring 29 that acts as a g-value spring. To control the tooth gap, a control lever 30 is disposed on the control disk 27. When the inertial mass 28 and the control disk 27 rotate relative to one another, the control lever 30 is moved from the inertial mass 28 and is introduced into a circumferential inner toothing 31 of the housing cover 26, so that the control disk 27, in a respectively defined position, is held firmly in position and is prevented from rotating further. For this purpose and in particular with regard to receiving the bent portions 21, the inertial mass 28 is symmetrically embodied in a pendulum-like fashion with two T-shaped portions beyond the ends of the spindle core 15 (FIG. 4). Furthermore, the control disk 27 is provided with an outer toothing 27a that cooperates with a non-illustrated vehicle-sensitive system for arresting the rotational movement of the control disk 27.

As can be seen from FIG. 5, the U-shaped bent portion 21 of a given connecting rod 20 extends through the control disk 27 twice, so that the latter is supported directly adjacent to the end of the spindle 14. Although it is possible to have the connecting rod 20 extend through the control disk 27 without radial play, to move the bent portion 21, which can be deflected radially outwardly, out of the spindle section 16, 17 and introduce it into the looking position, where it engages the housing toothing 23, the pertaining opening 32 is embodied with radial play so that a relative movement of the control disk 27 relative to the spindle 14 effects a pivoting of the bent portion 21 radially outwardly, with the control space 32 bringing about the radial deflection.

Figure 7:
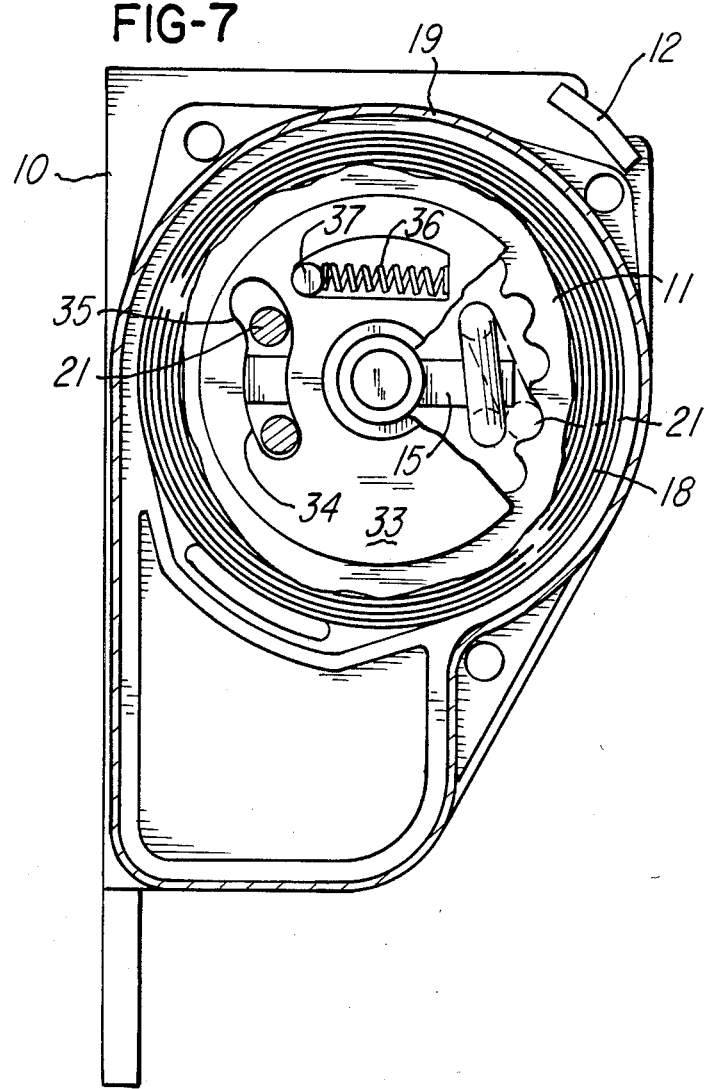
FIG. 7 is a partially sectioned side view of the spring end of the mechanism showing the resetting disk.
Figure 8:
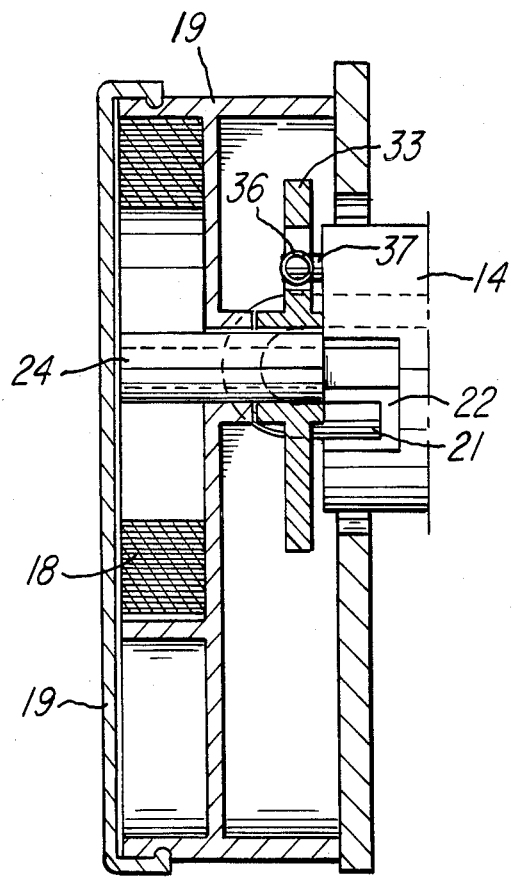
FIG. 8 is a cross-sectional view through the spring end of the mechanism.

FIGS. 7 and 8 illustrate that end of the belt reel-in mechanism that is provided with the winding spring 18 and is opposite the previously described operational end. Additionally disposed at this end is a resetting disk 33 for the locking members 21. From the standpoint of symmetry, this resetting disk 33 is disposed in the same manner as the control disk 27. The bent portions 21 of two connecting rods 20 also extend twice symmetrically through the resetting disk 33 via openings 34, so that the disk 33 is also disposed and supported directly adjacent the end of the spindle. In the vicinity of the bent portion 21, which can be pivoted out, each opening 34 of the resetting disk 33 merges with an angled portion 35 that is directed radially outwardly in conformity with the locking position of the locking members 21. The transition zones are rounded off in such a way that the bent portions 21 are easily guided in the openings 34 and the associated angled portions 35. The resetting disk 33 is coupled to the spindle 14 and is loaded relative thereto by a spring 36 that is supported via a pin 37 that is disposed on the associated half shell 16, 17.

The self-locking belt reel-in mechanism just described operates as follows: during normal operation, the belt can be withdrawn from the spindle 14 or can be wound thereupon, with those components that are coupled to the spindle 14 for their rotational movement, namely the resetting disk 33 on the one hand as well as the control disk 27 and inertial mass 28 on the other hand, rotate along with the spindle 14. If due to a belt aooeleration that is greater than the threshold value of the g-value spring 29, a corresponding acceleration of the spindle oocurs, the result is a relative rotation of the control disk 27 and the inertial mass 28 relative to one another. The inertial mass 28 ensures a deflection of the lever 30 into the toothing 31 of the housing cover 26, whereby the meshing of the lever 30 in the aforementioned toothing 31 thereby preventing further rotation of the control disk 27 at the defined location. A similar stopping of the rotational movement of the control disk 27 is effected upon operation of the non-illustrated vehicle-sensitive system by having a sensor-controlled lever mesh with the outer toothing 27a of the control disk 27.

The thus occurring relative rotation of the control disk 27 and spindle 14, due to the lagging of the control disk 27, now effects a radial deflection of the bent portions 21 into the toothing 23 that is integral with the housing, with the openings 32 of the control disk 27 guiding the locking members 21 radially outwardly into the rounded toothing 23. At the same time, the radial deflection of the looking members 21 also effects a rotation of the resetting disk 33 relative to the spindle 14 against the force of the spring 36, with the bent portions 21 entering the angled portions 35 from the openings 34.

When the system is relaxed, there now results on the spring end of the belt reel-in mechanism a return of the bent portions 21 into the openings 34 via the angled portions 35, with the spring-loaded resetting disk 33 again assuming a starting position relative to the spindle 14. At the same time, there is also effected, in the same direction, a return of the locking members 21 via the relaxing of the control disk 27.

Due to the symmetrical locking at four locations, and the uniform application of force associated therewith, the housing for the belt reel-in mechanism can be kept very small since uneven loads, twisting of the spindle, and a point-wise stressing of the spindle mounting due to radial stressing of the spindle itself no longer occur. Equal force pairs are formed at the oppositely disposed locking locations, thus bringing about a symmetrical loading.

The straightforward construction of the wire pawls as the connecting rods 20 with bent-over locking member configurations 21 is shown in FIGS. 9 and 9a, which also clearly show the two-part spindle construction. As shown in FIGS. 10 and 10a, the overall width of the belt reel-in mechanism can be reduced even further if the curved parts of the bent portions 21 are flattened relative to the connecting rods 20.

The present invention is, of course, in no way restricted to the specific disclosure of the specification and drawings, but also encompasses any modifications within the scope of the appended claims.

What I claim is:

1. In a self-locking belt reel-in mechanism having a belt-winding spindle that is mounted in a housing and is loaded by a rewinding spring, where said belt-winding spindle comprises a spindle core and a spindle body, at each end of which are disposed two locking members that operate radially between an inner position and an outer position, are surrounded by stops on said housing, and bring about a symmetrical quadruple locking, with said locking members being coupled by connecting rods that are parallel to the central axis of said belt-winding spindle, are disposed within the cross-sectional area of said spindle, and rotate with the latter, and with said locking members meshing with said housing stops when self-locking is initiated via a system that is sensitive to the movement of the belt and/or of the vehicle, the improvement therewith which comprises that:

said connecting rods have ends on which are integrally connected said locking members, which axially embrace and surround said spindle core symmetrically relative to the respective connecting rod; and said housing stops are toothings, with said locking members being pivotable about the longitudinal axis of their connecting rod in a radially outward direction until they mesh in said toothings.

2. A belt reel-in mechanism according to claim 1, in which said spindle core has a flat, rectangular configuration, and in which the ends of said connecting rods are bent over in a U-shaped manner to form said locking members, thereby symmetrically enclosing said spindle core and being disposed at respective ends of the latter in such a way that said bent-over locking members are pivotable radially outwardly about said longitudinal axis of their connecting rod.

3. A belt reel-in mechanism according to claim 2, in which the arrangement of said locking members on said connecting rods is such that in the locked state said spindle core serves as an abutment.

4. A belt reel-in mechanism according to claim 3, in which the amount of bend of a given locking member is such that in the locked state the projected distance from the connecting rod to the locking member corresponds to the thickness of said spindle core.

5. A belt reel-in mechanism according to claim 4, in which said connecting rods have a round cross-sectional shape, and said toothings on said housing have teeth that are rounded in conformity with the profile of said oonnecting rods.

6. A belt reel-in mechanism according to claim 5, in which the radius of curvature of said locking members is flattened.

7. A belt reel-in mechanism according to claim 2, which includes a control disk that is coaxial to said belt-winding spindle, and also includes a mechanism for precise activation of said control disk.

8. A belt reel-in mechanism according to claim 7, in which each of said bent-over locking members on first corresponding ends of said connecting rods extend twice through said control disk via appropriate openings in the latter, with said openings having a slot-like configuration and providing guidance, with play, for said locking members.

9. A belt reel-in mechanism according to claim 8, in which that end of said mechanism remote from said control disk is provided with a resetting disk for said control members, with said resetting disk being coaxial to said belt-winding spindle and being spring-loaded relative thereto.

10. A belt reel-in mechanism according to claim 9, in which each of said bent-over locking members on second corresponding ends of said connecting rods extend twice through said resetting disk, at both ends of said spindle core, via appropriate openings which each have an angled portion that is directed radially outwardly in conformity with the radially outwardly deflected locking position of said locking members.

11. A belt reel-in mechanism according to claim 10, in which said openings of said resetting disk merge into said angled portions via rounded edges to facilitate movement of said locking members between said openings and said angled portions.

12. A belt reel-in mechanism according to claim 9, in which said spring loading between said resetting disk and said belt-winding spindle is effected via a spring, one end of which is secured to said resetting disk, which the other end is secured to said spindle body via a pin.

13. A belt reel-in mechanism according to claim 8, in which said slot-like openings in said control disk each have an angled portion that is directed radially outwardly in conformity with the radially outwardly deflected locking position of said locking members.

14. A belt reel-in mechanism according to claim 2, which includes means for mounting said belt-winding spindle in said housing, and in which said spindle body comprises two half shells that surround said spindle core and said mounting means.

* * * * *

UNITED STATES PATENT AND TRADEMARK OFFICE
CERTIFICATE OF CORRECTION

PATENT NO. : 4,802,634
DATED : 7 February 1989
INVENTOR(S) : Klaus P. Singer

It is certified that error appears in the above-identified patent and that said Letters Patent is hereby corrected as shown below:

On the cover page, please correct the spelling of the first name of the inventor as follows:

[75]   Klaus P. Singer, Hamburg, Fed. Rep. of Germany

Signed and Sealed this

First Day of August, 1989

Attest:

DONALD J. QUIGG

Attesting Officer

Commissioner of Patents and Trademarks